Dec. 8, 1959     L. C. HAMMOND     2,915,857
ELEVATING AND TRAVERSING MECHANISM FOR A GRINDING MACHINE
Filed June 10, 1957     4 Sheets-Sheet 1

INVENTOR.
LEE C. HAMMOND
BY
Woodhams Blanchard & Flynn
ATTORNEYS

Dec. 8, 1959     L. C. HAMMOND     2,915,857
ELEVATING AND TRAVERSING MECHANISM FOR A GRINDING MACHINE
Filed June 10, 1957     4 Sheets-Sheet 4

INVENTOR.
LEE C. HAMMOND
BY
Woodhams Blanchard & Flynn
ATTORNEYS

United States Patent Office 2,915,857
Patented Dec. 8, 1959

2,915,857

ELEVATING AND TRAVERSING MECHANISM FOR A GRINDING MACHINE

Lee C. Hammond, Kalamazoo, Mich., assignor to Hammond Machinery Builders, Inc., Kalamazoo, Mich., a corporation of Michigan Application June 10, 1957, Serial No. 664,697

2 Claims. (Cl. 51—165)

This invention relates in general to an article handling device including an adjustable article support, and more particularly, to a work support for a grinding machine and to a manually operable mechanism for raising said work support in accurately controllable, relatively small increments.

Article handling devices, such as those used with grinding machines and having a horizontally reciprocable work support disposed beneath the grinding wheel, are well known. It is also well established to provide mechanism for adjusting the position of said work support, both vertically and in a horizontal direction crosswise of the direction of the reciprocation of said work support. It is further known that such adjustment can be made, both while the reciprocation of the support is being carried out and while said support is at rest.

Where the machine is of the type used to remove substantial amounts of material from the work piece, it is standard practice to effect such removal by reciprocating the work piece beneath, and in contact with, the cutting means, such as the periphery of a grinding wheel, while the moving work piece toward the grinding wheel in small increments at the end of each stroke of the work piece with respect to the cutting means. Usually, this method is utilized on extremely hard metals, such as machine tool bits, and the work piece is raised, or moved toward the grinding wheel, a relatively small amount, such as 0.001 inch, in each increment of movement. It is also common to effect such increment of movement only after one complete cycle of reciprocation of the work support, which constitutes two opposite movements of the support. However, this is a matter of choice, since there may be other circumstances under which the work pieces may be moved another increment toward the grinding wheel after each stroke of the work support, or still other circumstances may require several reciprocations of the work support between each increment of movement of the work piece toward the grinding wheel.

In any event, the existing mechanisms used for advancing the work piece by increments toward the grinding wheel have created a number of problems, paramount among which is the extreme sensitivity of such mechanisms and the resultant care which must be exercised in their operation. Insofar as I am aware, present devices for effecting said movement of the work piece toward the grinding wheel are operated by a device of the nature of a crank, which must be manually moved a relatively small distance in order to effect a corresponding movement of the work piece. Such operation not only requires considerable skill, but also requires that the operator divide his attention between the work piece and the device effecting the work-raising operation. Because of the relatively small crank movements required to effect the normal movement of the work piece, it is often necessary that the operator visually check a scale which indicates the amount of movement of the work piece. Such checking is particularly essential where an improperly large movement of the work piece would result, as it well may, in injury to the grinding wheel and/or the work piece.

Further, a crank has the undesirable characteristic, particularly where it is moved in small unidirectional increments, of requiring a continuous change in the direction of the force being applied to move it. Thus, it is extremely difficult to move a crank in uniform, successive amounts without visually checking such movement, even though the amount of this movement is sufficient to be easily detectable.

Still further, the fixed location of cranks presently used for effecting such movement of the work piece toward the grinding wheel is often inconvenient to a particular operator.

Accordingly, a principal object of this invention is the provision of an article handling device having a horizontally reciprocable work support disposed adjacent to a cutting means, such as a grinding wheel, and having manually operable mechanism for effecting accurate, relatively small, increments of movement of said work support toward said cutting means, without necessitating continuous visual checking of a scale associated with such mechanism.

A further object of this invention is the provision of a manually controllable work elevating mechanism for a grinding machine, as aforesaid, wherein the manually engageable element of said mechanism is a cylindrical drum which is comfortably engageable by the palm of a normal, adult hand, said drum being so mounted that a rather substantial, and easily detectable, rotation thereof will result in a very small movement of the work support in the desired direction, said drum being easily adjusted into a variety of positions to accommodate the preferences of different operators.

A further object of this invention is the provision of work elevating mechanism, as aforesaid, wherein the movement of said manually engageable element is of such amount and in such direction that a relatively unskilled machine operator can quickly become accustomed to the right amount of movement required for effecting a desired amount of movement of the work piece, wherein the possibility of a damaging over-movement of the manually engageable element is substantially reduced, or eliminated, this being accomplished by providing a substantially high ratio in the amount of movement which is required of the manually engageable element in order to effect a desired movement of the work piece.

A further object of this invention is the provision of work elevating mechanism, as aforesaid, wherein the manual movement required is substantially lineal.

A further object of the invention is the provision of work elevating mechanism, as aforesaid, which is provided with a disengageable, high speed crank for effecting a relatively rapid movement of the work support with respect to said grinding wheel and along the path of said increments of movement.

A further object of the invention is the provision of work elevating mechanism, as aforesaid, wherein the manually engaged portion may be readily adjusted into a large number of positions in order that the operator may have a wide choice of hand positions.

A further object of this invention is the provision of work elevating mechanism, as aforesaid, which can be easily adapted for use with a variety of different machines of this general type wherein a plurality of relatively small movements in substantially uniform increments are desired, and wherein the need for human discretion is sufficiently frequent as to necessitate the use of manually controllable mechanism.

A further object of this invention is the provision of work elevating mechanism, as aforesaid, which is relatively simple in operation, which is easy to adjust, which requires no special maintenance, and which can be operated and adjusted by any person capable of operating a conventional grinding machine of this general character.

Other objects and purposes of this invention will become apparent to persons familiar with this type of machine upon reading the following specification and examining the acompanying drawings, in which:

Figure 5 is a sectional view taken along the line V—V of Figure 2 and rotated 90 degrees clockwise.

Figure 1:
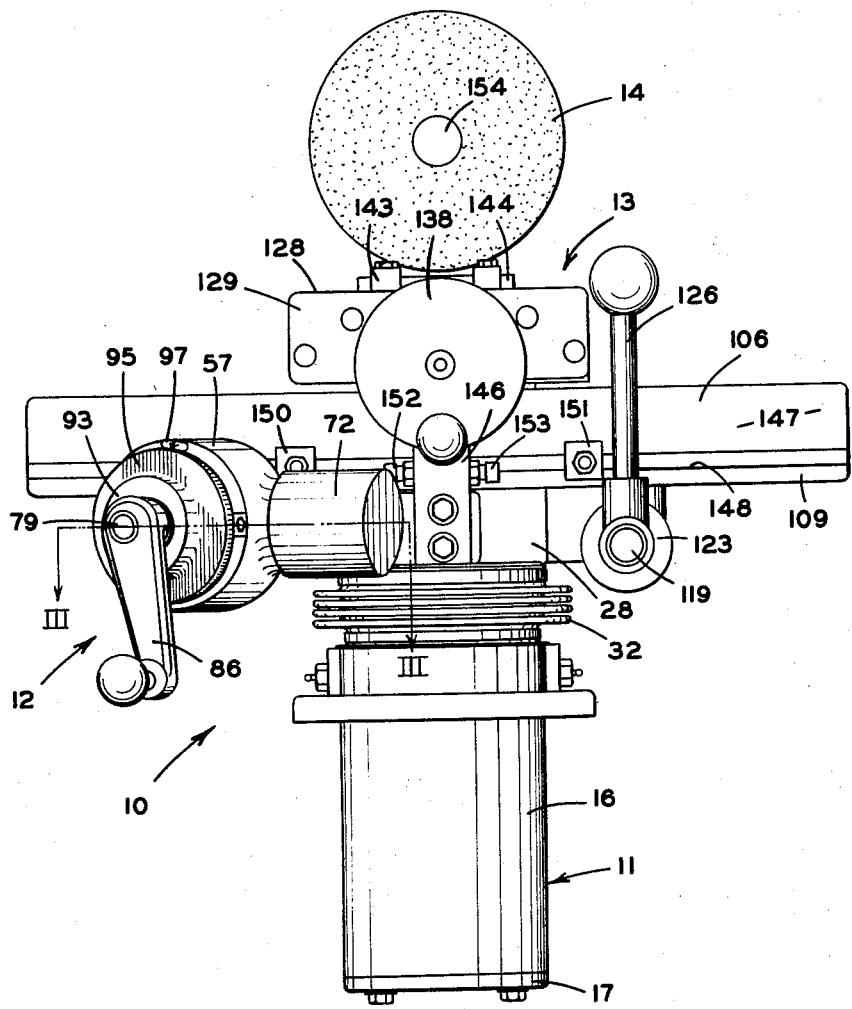
Figure 1 is a front elevational view of a portion of a machine including the invention.

For the purpose of convenience in description, the term "front," and derivatives thereof, will have reference to that side of the machine shown in Figure 1, which is the side adjacent to the normal position of the operator. The terms, "left," "right," "upper," "lower," "rear," and derivatives thereof, will have reference to said operator's position in front of said machine when said machine is in its normal position of operation, as shown in Figure 1. Other terms, which may be used hereinafter for convenience in denoting direction, such as "horizontal" and "vertical," will have reference to the normal operating position of the machine, as shown in Figure 1, and no other significance is intended by the use of such terms.

*General description*

In order to meet the objects and purposes set forth above, as well as others related thereto, there has been provided an article handling device having a work support by which an item of work may be held in predetermined relation with, or moved through a predetermined pattern with respect to, an article working device, such as a grinding wheel. Said work support is here adjustably supported upon a pedestal for horizontal reciprocation with respect to the article working device. Elevating mechanism, including a manually operable member, is mounted upon and partially within said pedestal for raising and lowering said work support, whereby a work piece thereon can be moved toward, and away from, the article working device in easily controllable and manually selectable increments. It will be recognized that, although the article handling device is arranged and constructed in this particular embodiment for use with a grinding machine, such disclosure is for illustrative purposes only and is neither intended nor believed to limit the scope of the invention.

*Detailed description*

As shown particularly in Figures 1 and/or 2, the article handling device 10, to which this invention relates, is comprised of a base pedestal 11, which partially houses and completely supports the elevating mechanism 12, upon which the work support 13 is mounted for controlled, horizontal reciprocation adjacent to means, such as the grinding wheel 14, of a conventional grinding machine.

The base pedestal 11 (Figures 1 and 4) has a hollow, cylindrical casing 16, which is axially vertical and has a bottom plate 17, from which a screw support post 18 extends upwardly within said casing 16 and spaced from the side walls thereof. Said screw post 18 is provided with an axially vertical opening 19 which is preferably coaxial with the casing 16. An internally threaded sleeve 21 is removably held coaxially within the upper end of said vertical opening 19 and threadedly engages the lift screw 22, which extends into the screw opening 19. A pair of guide elements 23 and 24 are supported upon, and extend radially inwardly from, diametrically opposite sides of the casing 16, preferably near the upper end thereof.

The elevating mechanism 12 (Figure 4) includes a hollow, cylindrical, lift column 26, which is axially slidably disposed within the cylindrical casing 16. Said column 26 has a coaxial, cylindrical opening 27, into which the screw support post 18 is received without interference. Said column 26 has an enlarged head 28 near the upper end thereof, which head is engageable with the upper edge of the casing 16 when said column 26 is in its lowermost position. The outer surface of the column 26 is provided with a pair of vertically and diametrically disposed grooves 29 and 30, into which the guide elements 23 and 24 are slidably received for preventing rotation of the central column 26 with respect to the casing 16. A substantially cylindrical bellows 32 is secured to, and extends between, the lower end of the head 28 and the upper end of the cylindrical casing 16, for the purpose of enclosing the space between said head and said casing when said head is raised in a manner discussed hereinafter.

The head 28 on the column 26 (Figure 4) has an upper wall 33 which is provided with a vertical opening 34 and said opening is threaded at its upper end.

The upper end of the lift screw 22 is provided with a threaded portion 36 of reduced diameter, which extends coaxially through, and is spaced inwardly from, the wall of the opening 34. A first bevel gear 37, having downwardly facing teeth and an upwardly extending hub 38, is mounted upon said reduced portion 36 adjacent to the shoulder 39 created by the reduced portion 36. A lock collar 41, which has an annular flange 42 near its upper end, threadedly engages said upper, reduced portion 36 of the screw 22 and firmly holds said gear 37 against said shoulder 39. A bearing 43 is mounted upon the hub 38 of the bevel gear 36 and within the opening 34 in the wall 33, for locating the rotational axis of the gear 37, hence, the screw 22, with respect to the column 26. An externally threaded ring 44 encircles the lock collar 41 between the flange 42 thereon and the bearing 43. Accordingly, the weight of the column 26 is at least partially supported through the bevel gear 37, the bearing 43 and the ring 44 upon the lift screw 22.

A relatively strong, spiral spring 46 (Figure 4) encircles the screw 22, between the lower surface of the bevel gear 37 and the thrust bearing 47 supported upon the upper end of the screw support post 18. Accordingly, the weight of the column 26 and its cylindrical head 28 are also partially supported through the bevel gear 37, the bearing 43, the ring 44 and the spring 46 upon the screw support post 18. Thus, since the weight of the central column 26 and the parts supported thereon is only partially supported directly by the lift screw 22, the force which would otherwise be required to rotate the lift screw is substantially reduced.

The lift head 28 (Figure 4) is provided with a radially disposed opening 48, into which the cylindrical shaft housing 49 is received and secured. Said shaft housing 49 has a coaxial shaft opening 51 in which the bearings 52 and 53 (Figures 4 and 3) are supported near the inner and outer ends thereof, respectively. A main shaft 54 is rotatably supported within, and extends beyond, said bearings 52 and 53. A first bevel pinion 56 is mounted upon, and is rotatable with, the inner end of the shaft 54 and is arranged for engagement with the bevel gear 37.

A gear housing 57 (Figures 2 and 3) having a central cavity 58, has a first integral sleeve 59 with a cylindrical opening 61, which communicates with said cavity 58. The sleeve 59 is slidably and rotatably mountable upon the outer end of the shaft housing 49. A set screw 62 extends through the sleeve 59 for adjustably positioning the gear housing 57 with respect to, and upon, the shaft housing 49. Said gear housing 57 has an end wall 63, remote from the sleeve 59, which supports a bearing 64 through which the outer end of the main shaft 54 extends, and in which it is rotatably supported. A second bevel gear 66 is mounted upon, and rotatable with, the main shaft 54 within the cavity 58 and between the bearings 53 and 64.

Said gear housing 57 (Figure 3) has a second integral sleeve 67 which communicates with the cavity 58 and extends substantially perpendicularly to the axis of the main shaft 54. A stub shaft 68 is rotatably supported by means of the bearings 69 within, and extends beyond both ends of, the sleeve 67. A second bevel pinion 71 is supported upon, and rotatable with, the stub shaft 68, and engages the bevel gear 66. A manually engagable drum 72, having an axial recess 73, is secured, as by means of a set screw 74, upon the outer end of the stub shaft 68 so that the sleeve 67 extends into, and is spaced from, the walls of the recess 73. Accordingly, rotation of the drum 72 acts through the stub shaft 68, the bevel pinion 71 and the bevel gear 66 to effect rotation of the main shaft 54. As clearly appearing in Figure 2, the drum 72 is of such size that the operator may merely place the palm of his left hand on the surface of the drum and operate it by moving his entire hand.

Figure 6:
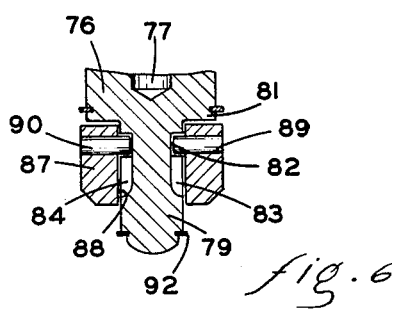
Figure 6 is a sectional view taken along the line VI—VI of Figure 3.

A shaft extension 76 (Figure 3), which has a coaxial recess 77 into which the outer end of the main shaft 54 is slidably and snugly received, is secured upon the outer end of said main shaft by means of the set screw 78. Said shaft extension 76 has an outer portion 79 (Figure 6) of reduced diameter, thereby providing the annular shoulder 81 between the axial ends of said shaft extension. An annular groove 82 is provided in the reduced portion 79 near the shoulder 81. A pair of diametrically disposed grooves 83 and 84 (Figure 6) are provided in said reduced porion 79 parallel with the axis thereof and extending outwardly from the annular groove 82. A crank 86 has a hub 87 with a coaxial opening 88, in which the reduced portion 79 of the shaft extension 76 is rotatably disposed. A pair of diametrically opposed pins 89 and 90 are radially disposed in the hub 87 and extend into its opening 88 for slidable disposition within the annular groove 82 and for slidable insertion, respectively, into the grooves 83 and 84. Accordingly, when the pins 89 and 90 are in the annular groove 82, the shaft extension 76 can rotate with respect to the crank 86. However, when the pins 89 and 90 are in their respective grooves 83 and 84, then rotation of the crank 86 will effect rotation of the shaft extension 76, hence rotation of the main shaft 54 to which said shaft extension is secured. A snap ring 92 (Figure 6), located at the outer end of the reduced portion 79, cooperates with the shoulder 81 to limit the axial movement of the crank 86 with respect to said reduced portion 79.

A flanged collar 93 (Figure 3) is secured upon the shaft extension 76 by means of the set screw 94 adjacent to the end wall 63 of the gear housing 57. The flange 95 of said collar 93 is provided with a scale along the periphery thereof for cooperation with an indicator 97 (Figure 2) on the gear housing 57 adjacent to said collar 93. It will be observed that by providing sufficient difference in size between the bevel gear 66 and the bevel pinion 71, a relatively substantial rotational movement of the drum 72 will effect a relatively small rotational movement of the collar 93. However, if a much faster rotation of said collar 93 is desired, such can be effected by engaging the crank 86 with the shaft extension 76 and rotating same. Because of the difference in size between the bevel gear 37 and bevel pinion 56, which are disposed within the cylindrical head 28 at the upper end of the column 26, a relatively large rotational movement of the main shaft 54 will result in a relatively small rotational movement of the lift screw 22.

By the gear reductions so provided, ratios in the order of from 200:1 to 300:1 can be easily obtained between the peripheral movement of the drum 72 and the vertical movement of the screw 22. Accordingly, a substantial, easily detectable amount of movement of the drum 72 will produce a very slight raising of the screw 22, hence, any object supported thereon, in accordance with the purposes of the invention.

Figure 2:
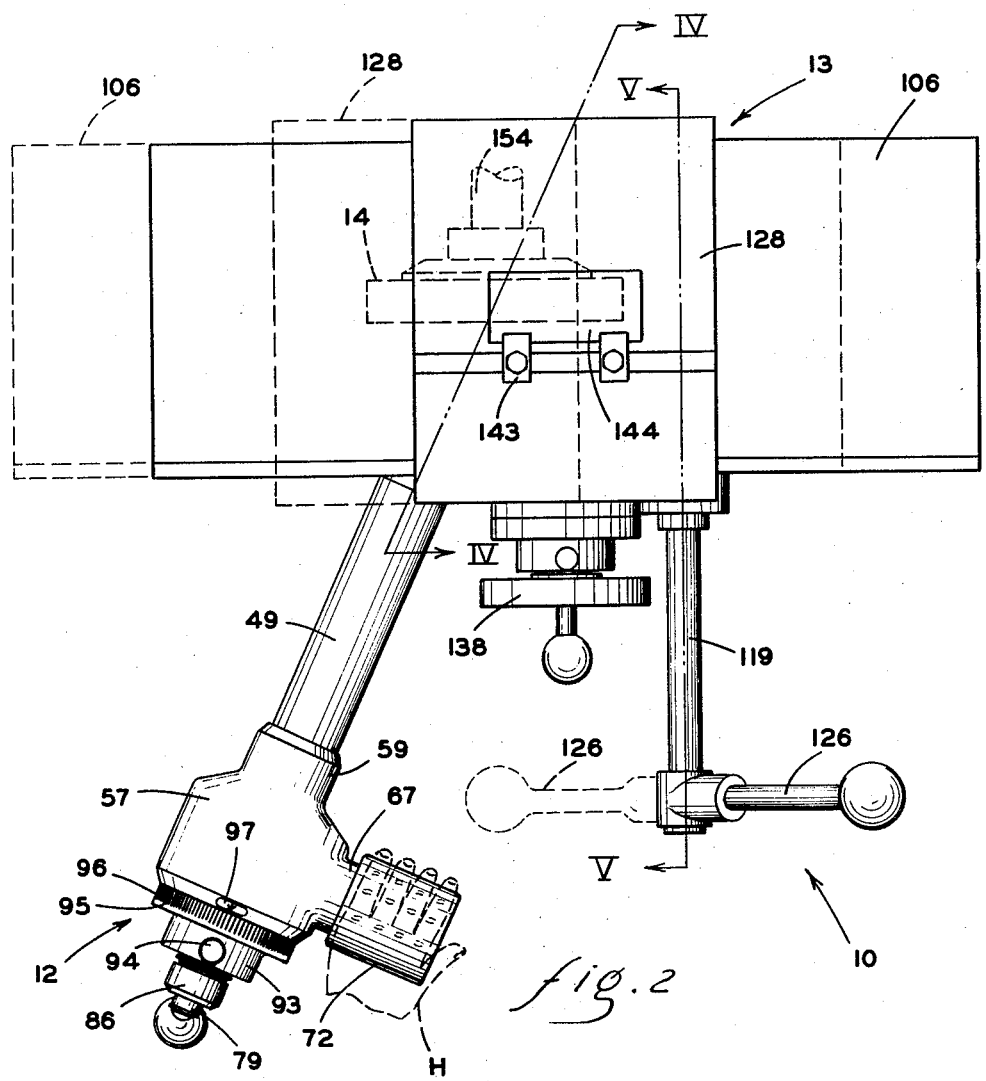
Figure 2 is a top plan view of said machine, with the work support thereof in two different operating positions.

A pair of horizontal, parallel rails 98 and 99 (Figure 4) are mounted upon the upper end of the lift head 28 so that they extend leftwardly and rightwardly with respect to the operator's position in front of the article-handling device 10, thus being substantially transverse of the main shaft housing 49 (Figure 2). Said rails 98 and 99 have frontwardly and rearwardly opening grooves 101 and 102, respectively, which extend lengthwise thereof. A work support base 106, which is the lower portion of the work support 13, is disposed above the lift head 28. Said support base 106 has front and rear downwardly extending flanges 109 and 110, respectively. A pair of rails 104 and 105, having parallel grooves 107 and 108, respectively, are mounted upon the opposing, inner sides of the flanges 109, and 110, so that the grooves 107 and 108 face each other. A plurality of bearing balls 103 are disposed between and within said grooves 101 and 107, and between and within the grooves 102 and 108, respectively. Adjustment studs 13, which extend through the flange 110 and engage the rail 105, are provided for holding the bearing balls 103 snugly between their cooperating rails 98 and 104, and 99 and 105, respectively. Set screws 114 hold the rail 99 in position after such adjustment has been made. A horizontal rack 116, having downwardly extending teeth, is secured upon the lower edge of the rear flange 110, by means of the screws 117, and extends lengthwise thereof.

A tubular bearing support 123 (Figures 1 and 5) is mounted upon the rightward side of the lift head 28 by means, such as the bolts 124. A reciprocation shaft 119 is rotatably supported within the bearing support 123 by means of the bearings 121 and 122. A gear 118, which is mounted upon the rear end of the shaft 119, is continuously engageable with the rack 116. A manually operable lever 126 is secured upon the front end of the shaft 119 for oscillating said shaft 119, hence, said gear 118, whereby the work support base is reciprocated crosswise of the lift head 28.

The work support base 106 (Figures 4 and 5) has an upwardly extending slide block 127, upon which the work support table 128, which is part of the work support 13, is slidably supported. Said work support table 128 has a downwardly extending face plate 129 secured to its front edge. A horizontally disposed screw 131, which is preferably parallel with the reciprocation shaft 119, is threadedly received through an adjustment nut 132, which is secured upon the upper surface of the work support base 106. The front end portion 133 of said screw 131 is reduced in diameter to provide the annular shoulder 134. Said reduced front end 133 slidably extends through, and is rotatably supported within, an opening 135 in the face of the plate 129 by means of the bearings 136. The front end of the reduced portion 133 is threaded for threaded engagement by the hub 137 of the control wheel 138. A spacing collar 139 is secured upon the hub 137 by the set screw 141. The spacing collar 139 and the shoulder 134 on the screw 131 are disposed on opposite sides of the face plate 129 and positively prevent any appreciable axial movement of the screw 131 with respect to the work support table 128. Accordingly, rotation of the wheel 138 will effect forward or rearward movement of the work support table 128 with respect to the work support base 106 in a substantially conventional manner.

The upper surface of the work support table 128 (Figures 2 and 5) is provided with an undercut groove 142, which is substantially parallel with the rails 104 and 105. Work piece clamps 143 (Figures 2 and 5) of any suitable, conventional type are adjustably and removably mounted within said groove 142 for the purpose of holding a work piece 144 in a desired position upon the work support table 128.

A reciprocation control block 146 (Figures 1 and 4) is mounted upon the front surface of the lift head 128 and extends upwardly therefrom along, and spaced from, the front surface 147 of the front flange 109 (Figures 4 and 5) of the work support base 112. A horizontal, undercut groove 148 is provided in the front surface 147 of the flange 109. A pair of stop blocks 150 and 151 are removably mounted within the groove 148 on opposite sides of the reciprocation control block 146, which extends above said groove 148. Screws 152 and 153 are adjustably mounted upon opposite sides of the control block 146 for engagement, respectively, with the stop blocks 150 and 151 when the work support base 112 is moved rightwardly and leftwardly, respectively, as appearing in Figure 1. Accordingly, the reciprocable movement of the work support 13, which is effected by operation of the lever 126, can be accurately controlled by the stop blocks 150 and 151 in their engagement with the screws 152 and 153, respectively.

As clearly appearing in Figure 2, the relative arrangement of the drum 72 and of the traversing handle 126 is such that the movement of said traversing handle is in a direction substantially parallel with the diameter of the grinding wheel and the axis of said drum is sufficiently close to parallelity with a diameter of the grinding wheel that the hand moving said drum will move substantially toward or away from said wheel in effecting rotation of said drum.

The grinding wheel 14 is mounted upon a shaft 154 (Figures 1 and 2) in a substantially conventional manner, for rotation about a horizontal axis, in this particular embodiment, by means not shown.

Operation

Prior to operation of the article-handling device 10 (Figures 1 and 2) in conjunction with means such as the grinding wheel 14 of a conventional grinding machine, said article-handling device 10 will be properly adjusted and set up. Such set up and adjustment may, for example, commence by placing a work piece 144 upon the work support table 128, after which it is clamped in a desired position by means of the work piece clamps 143 (Figures 1 and 2). The work support table 128 is then adjusted rearwardly or forwardly with respect to the work support base 112 by turning the control wheel 138 (Figure 5) until the work piece 144 is located exactly as desired with respect to the grinding wheel 14. It is generally necessary to reciprocate the work piece 144 with respect to the axis of the grinding wheel 14 in order to accomplish the operation desired on the work piece. Thus, the stop blocks 150 and 151, as well as the screws 152 and 153, are positioned with respect to each other so that they will permit the amount of reciprocation needed. However, such control is not always necessary, in which case the stop blocks 150 and 151 can be moved to either end to permit maximum movement or they can be removed from the groove 148 completely.

Figure 3:
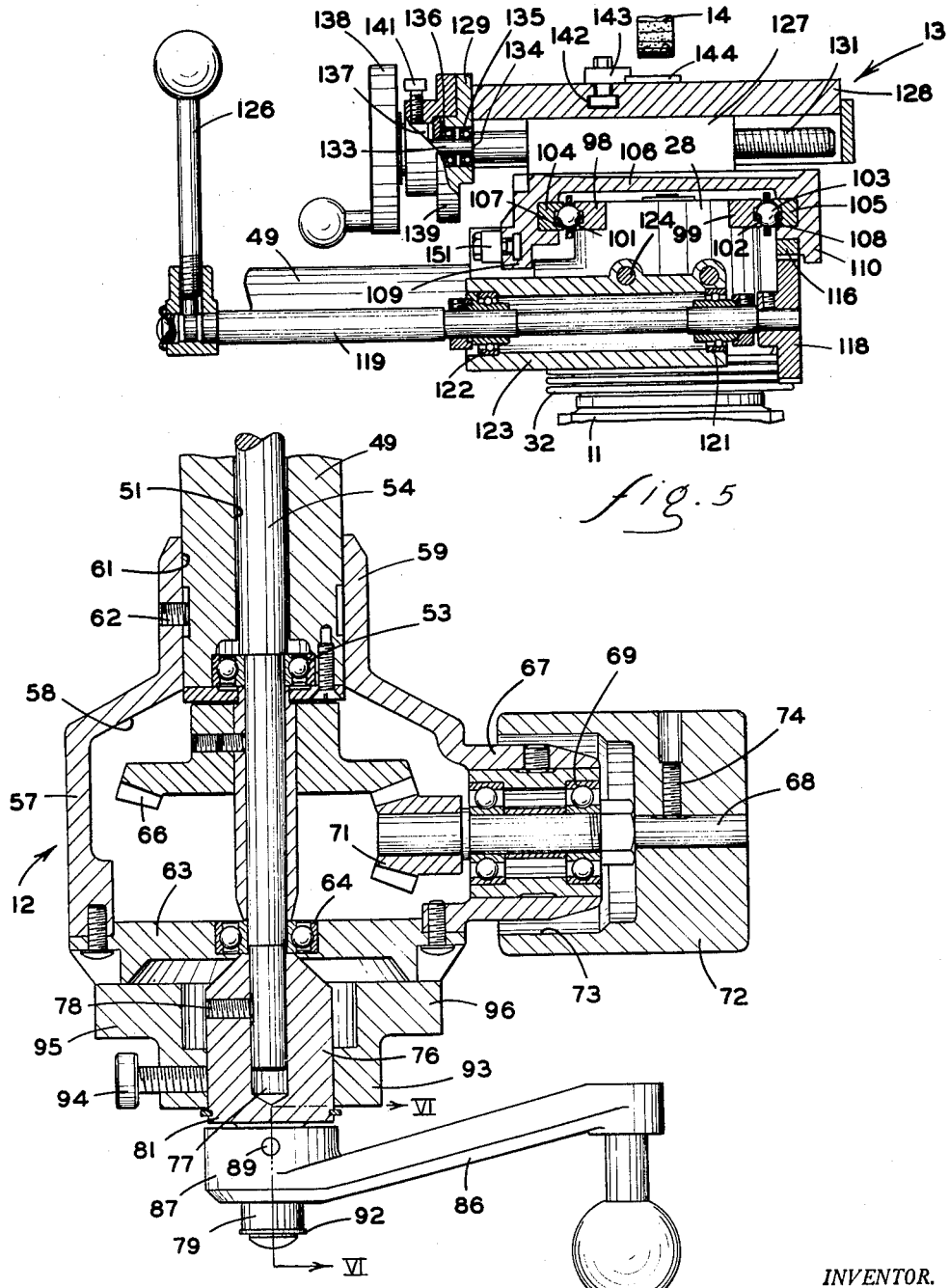
Figure 3 is a sectional view taken along the line III—III of Figure 1.
Figure 4:
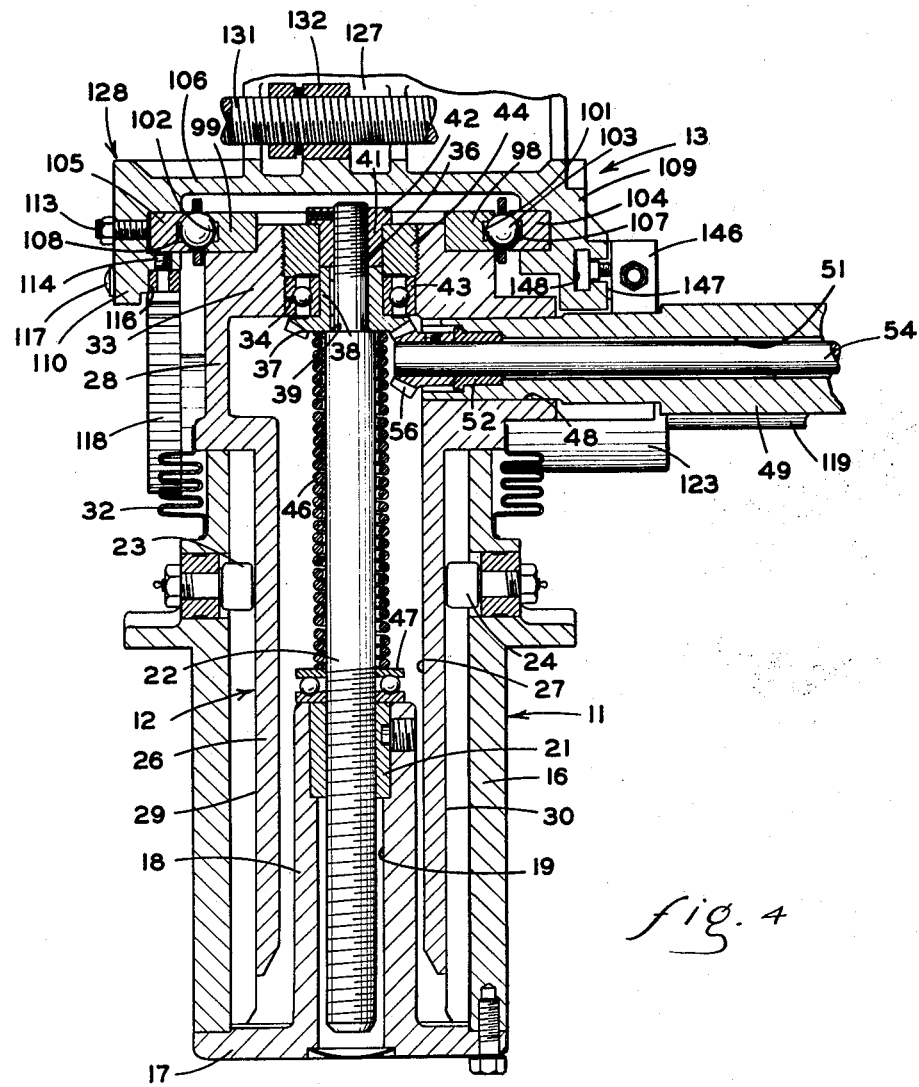
Figure 4 is a sectional view, substantially as taken along the line IV—IV of Figure 2.

The crank 86 (Figures 3 and 6) is now moved frontwardly away from the gear housing 57 so that the pins 89 and 90 on the hub 87 thereof are moved into the grooves 83 and 84, respectively. Said crank 86 is then turned, here in a clockwise direction, until the work piece 144 is moved up to a position of contact with the grinding wheel 14. As shown in Figures 3 and 4, rotation of the crank 86 operates through the main shaft 54, the bevel gear 37, bevel pinion 56 and lift screw 22 to raise the lift head 28 with respect to the screw support 18. The spring 46, which encircles the screw 22, opposes the force of gravity upon the lift head 28 and thereby assists in the upward movement of said lift head.

The position of the drum 72 (Figure 3) with respect to the axis of the main shaft 54 may now be adjusted to the convenience of the operator, by loosening the set screw 62 and rotating the gear housing 57 until the drum 72 is in the desired position, after which said set screw 62 is again locked in position against the shaft housing 49. The crank 86 is then moved axially toward the gear housing 57 until the pins 89 and 90 thereon are within the annular groove 82 so that rotation of the crank 86 will have no effect upon the main shaft 54 or parts associated therewith.

The grinding operation on the work piece 144 will commence with the work support table 128 in its leftward, broken line position, as shown in Figure 2, hence, with the lever 126 in its leftward, broken line position. Thus, as the work support table 128 is moved rightwardly into its solid line position, as shown in Figure 2, by appropriate movement of the lever 126 from its broken line postion to its solid line position, the work piece 144 will be moved in one direction against the periphery of the grinding wheel 14 for the initial cut. The lever 126 is then moved from its solid line position to its broken line position, thereby moving the work piece in the reverse direction past the grinding wheel and completing a cycle of reciprocation of the work support table. For purposes of illustration, it will be assumed that it is now desirable to raise the work piece. This is accomplished by placing the palm of the hand, as indicated at H in Figure 2, upon the peripheral surface of said drum and then moving the hand substantially lineally to rotate said drum. Rotation of said drum 72 will act through gears 71 and 66 to rotate the shaft 54 and this will act to lift or lower the work support table 128 in the same manner as above described for lifting or lowering thereof by the handle 86. In this particular embodiment, a movement of said hand rearwardly toward the work support 13 will effect a raising of the work support 13.

Because of the relatively large amount of rotational movement required by the drum 72 in order to produce a relatively small raising of the work support 13, it will be easy for the operator to become accustomed to the correct amount of manual movement necessitated to effect, relatively accurately, the desired amount of raising of the work piece 144. In the particular embodiment here used to illustrate the invention, the gear ratios, and the diameter of the drum 72, are such that it requires about one-fourth inch of peripheral movement of the drum to raise the work support 0.001 inch. The relationship between a given amount of rotation of the drum 72 and the amount of raising of the work piece resulting therefrom may be varied substantially by appropriate selection of gear ratios between the bevel gears 37 and 56 and between the bevel pinions 66 and 71, as well as by an appropriate selection of the diameter of the drum 72 and of the pitch in the lift screw 22.

After each increment of raising of the work support 13 by appropriate rotation of the drum 72, as just described, the lever 126 may be first moved rightwardly and then returned to its leftward, broken line position, as appearing in Figure 2. However, there may be circumstances, particularly where the operation is being performed on relatively soft materials, where it will be desirable to raise the work support 13 at both ends of the reciprocation stroke, and other uses may require several reciprocations between each increment of raising of the work. However, these are matters of choice and can be varied as desired or required.

When the operation has been completed upon the work piece 144, the work support 13 is moved to one or the other side of the grinding wheel 14, and lowered if desired, for the purpose of removing the work from the work support. Such lowering is accomplished by moving the crank handle 86 frontwardly and rotating same in the opposite direction from that in which it was rotated for the purpose of raising the work support 13 into position. The scale on the periphery 96 of the flange collar 93 permits the operator to visually check his manual operations in a relatively conventional manner.

Although a particular preferred embodiment of the invention has been disclosed in detail hereinabove for illustrative purposes, it will be understood that variations or modifications thereof, which do not depart from the scope of such disclosure, are fully contemplated unless specifically stated to the contrary in the appended claims.

I claim:

1. In a grinding machine having a grinding wheel, a work support table, a pedestal and supporting means supporting said table on said pedestal, elevating means within said pedestal for moving said supporting means upwardly and downwardly therein whereby said table may be raised or lowered with respect to said grinding wheel, traversing means for moving said table relative to said grinding wheel in a substantially horizontal direction, and control mechanism for effecting both traversing movement and upward and downward movement of said table, the improvement in said control mechanism comprising in combination: a first shaft extending transverse to said pedestal and extending beyond one side of said table; gear means connecting said first shaft to said elevating means for effecting operation thereof in response to rotation of said first shaft; a manually engageable handle operatively connected to said traversing means and located for operation by one hand of an operator whereby said work may be traversed across the wheel; manually operable rotatable means mounted at the outer end of said first shaft and being releasably engageable therewith for effecting rotation thereof; a second shaft geared at one end to said first shaft and extending therefrom in a direction toward said handle and so arranged that at least a major component of such direction is generally parallel with the direction of traversing movement of said table; an axially elongated drum arranged on said second shaft for effecting rotation thereof in response to rotation of said drum, reduction gearing connecting said second shaft to said first shaft for effecting a vertical movement of said supporting means of the order of 0.001 inch in response to a relatively large rotational movement of said drum between about 0.200 inch and about 0.300 inch of peripheral drum movement; the relative spacing between said drum and said handle being such that an operator facing the work can conveniently have one hand on said handle and the other hand on said drum and can control the vertical movement of said table by movement of the hand on said drum in directions generally toward and away from said work.

2. The device defined in claim 1 wherein said drum has an axial length substantially equal to the width of the palm portion of an average adult human hand.

References Cited in the file of this patent

UNITED STATES PATENTS

| | | |
|---|---|---|
| 1,108,779 | Norton | Aug. 25, 1914 |
| 1,268,961 | Gorham | June 11, 1918 |
| 2,178,022 | Orcutt | Oct. 31, 1939 |
| 2,611,220 | Selby | Sept. 23, 1952 |

FOREIGN PATENTS

| | | |
|---|---|---|
| 12,485 | Great Britain | May 29, 1906 |